United States Patent [19]

Tuma et al.

[11] Patent Number: 4,905,111
[45] Date of Patent: Feb. 27, 1990

[54] DAMPING MATERIAL OF AN IMPROVED FORMULATION FOR USE ON A MAGNETIC HEAD

[75] Inventors: Wolfgang Tuma, Vienna; Ulrich Traxlmayr, Laxenburg; Walter Kodym, Seebenstein, all of Austria; Jean H. J. Lorteije, Waalre; Roeland Den Bakker, Eindhoven, both of Netherlands

[73] Assignee: U.S. Philips Corp., New York, N.Y.

[21] Appl. No.: 224,105

[22] Filed: Jul. 26, 1988

[30] Foreign Application Priority Data

Jul. 30, 1987 [AT] Austria .................................. 1934/87

[51] Int. Cl.$^4$ ............................................... G11B 5/16
[52] U.S. Cl. ..................................... 360/126; 360/104
[58] Field of Search ............................... 360/125–127, 360/104

[56] References Cited

U.S. PATENT DOCUMENTS 4,528,652  7/1985  Horner et al. ...................... 367/162

FOREIGN PATENT DOCUMENTS 55-84021   6/1980  Japan .................................. 360/126
57-222643 12/1982  Japan .

Primary Examiner—John H. Wolff
Attorney, Agent, or Firm—William L. Botjer

[57] ABSTRACT

A damping material (19) is provided on one of the two side faces (7, 8), of a magnetic head having two plate shaped ferrite core limbs (3, 4). The material consists of a synthetic resin filled with less than 30% by volume of filler having a density of more than $10 \times 10^3$ kg/m$^3$. The filler is at least 74% by weight of the damping material and the density of the damping material is larger than $4 \times 10^3$ kg/m$^3$ and its modulus of elasticity ranges between $10^7$ and $10^9$ Pa.

5 Claims, 2 Drawing Sheets

DAMPING MATERIAL OF AN IMPROVED FORMULATION FOR USE ON A MAGNETIC HEAD

BACKGROUND OF THE INVENTION

The invention relates to a magnetic head having two combined plate-shaped ferrite core limbs with a tape contact face in which a gap bounded by the two core limbs terminates. A damping material is at least partly provided on one of the two side faces constituted by the two core limbs and extending transversely to the tape contact face. In such a magnetic head known from JP-A No. 55-84021 the damping material consists of a porous and inorganic material. Such a damping material is used to reduce interference signals occurring in the output signal of a magnetic head, which interference signals are produced when a record carrier, for example a magnetic tape is moved over the tape contact face of the magnetic head. In the Anglo-American literature such interference signals are also referred to as sliding noise or rubbing noise. Practice has proved that the damping material described in JP-A No. 55-84021 reduces such interference signals to an unsatisfactory extent.

SUMMARY OF THE INVENTION

The damping material is a synthetic resin filled with less than 30% by volume of filler, which filler has a density of more than $10 \times 10^3$ kg/m$^3$ and is at least 74% by weight of the damping material. The density of the damping material is larger than $4 \times 10^3$ kg/m$^3$ and its modules of elasticity is between $10^7$ and $10^9$ Pa. In this manner the interference signals produced when a record carrier is moved over the tape contact face of the magnetic head can be substantially prevented. This is due to the particular choice of the mixing ratios of the synthetic resin with the filler having a large density so that a damping material is obtained which itself has a large density but in which the particles of the filler embedded in the synthetic resin still have an adequate mutual freedom of movement in order to yield a satisfactory damping in co-operation with the synthetic resin. Due to the special choice of the modulus of elasticity of the damping material it is also achieved that the magnetic properties of the ferrite core limbs are not detrimentally influenced as a consequence of tensions produced in the ferrite when the damping material is cured, so that the magnetic head has invariable electrical signal properties.

In this respect it is to be noted that a sealing compound for the core limbs of a magnetic head accommodated in a housing is known from JP-A No. 57-222.643, which compound inter alia also reduces the interference signals produced when a record carrier is moved over the tape contact face of a magnetic head and which consists of an epoxy resin provided with a filler having a density of more than $5 \times 10^3$ kg/m$^3$, with $9.14 \times 10^3$ kg/m$^3$ being given as the largest density and $6.95 \times 10^3$ kg/m$^3$ being given as the smallest density in the examples. For the mixing ratio with the filler, 50 to 200 pts.wt to 100 pts.wt of the epoxy resin are indicated for the filler, which corresponds to a part by weight of the filler of between 33 and 66% by weight. If the resultant densities of the sealing compound itself are calculated therefrom, values of between $1.6 \times 10^3$ and $2 \times 10^3$ kg/m$^3$ are obtained, hence relatively small densities. The relevant ratios are indicated in the diagram shown in FIG. 1 in which the range of densities of the sealing compound resulting from the described examples is characterized by a cross-hatched area. This diagram also shows that only densities of at most approximately $3.2 \times 10^3$ kg/m$^3$ could be achieved for the sealing compound in the indicated mixing ratio for the sealing compound, even if a filler having a density which is larger than the density indicated in the examples were to be selected. The achievable damping with such sealing compounds is also correspondingly small. Indications about the modulus of elasticity of such sealing compounds cannot be derived from the JP-A No. 57-222.643. On the other hand a damping material according to the invention is used with a density of more than $4 \times 10^3$ kg/m$^3$ which is at least partly provided on at least one of the two side faces of the magnetic head. In this manner the interference signals produced when a record carrier is moved over the tape contact face of a magnetic head are suppressed very satisfactorily.

As can be derived from the relevant Handbooks, materials or alloys are suitable as fillers having densities of more than $10 \times 10^3$ kg/m$^3$. It has been proved to be very advantageous if the damping material comprises tungsten as a filler. In this manner the damping material can be manufactured in a simple manner at low cost, whilst densities of up to $6.6 \times 10^3$ kg/m$^3$ can be achieved for the damping material in the indicated mixing ratios due to the relatively large density of $19.3 \times 10^3$ kg/m$^3$ of tungsten.

In this respect it is to be noted that a material consisting of a resin filled with tungsten is known per se from U.S. Pat. No. 4,528,652 which, however, is used in connection with ultrasonic transducers for absorbing ultrasonic soundwaves without reducing or damping the oscillation capacity of the transducer, which is effected by a corresponding choice of the acoustic impedance. An other possibility of using this material, more specifically in connection with magnetic heads and a damping of its mechanical vibrations as in the case according to the invention, cannot be derived from U.S. Pat. No. 4,528,652.

It has been proved advantageous if the density of the damping material is chosen to be of the order of $5.2 \times 10^3$ kg/cm$^3$. With such a density of the damping material a uniform distribution of the particles of the filler in the synthetic resin and a perfect cladding thereof by the synthetic resin can be achieved, whilst the separate particles still have an adequate mutual freedom of movement to yield a satisfactory damping in co-operation with the synthetic resin. In this connection the order of magnitude is to be understood to have values of ±10%.

Furthermore it has been proved advantageous if the modulus of elasticity of the damping material is chosen to be of the order of $3 \times 10^8$ Pa. With a modulus of elasticity thus chosen, which is conventionally effected by adding a softener to the synthetic resin, tensions in the core limb ferrite produced during curing of the damping material are not too large to detrimentally change the electrical signal properties of the magnetic head. In this respect the order of magnitude is to be understood to have values of ±50%.

It has also been proved advantageous if the damping material is provided in the form of locally bounded areas while leaving intermediate spaces in between the areas. A damping material thus distributed also reduces or prevents tensions in the core limb ferrite produced during curing of the damping material so that, as already stated, the electrical signal properties of the magnetic head are not changed detrimentally.

DETAILED DESCRIPTION OF THE PREFERRED EMBODIMENT

Figure 2:
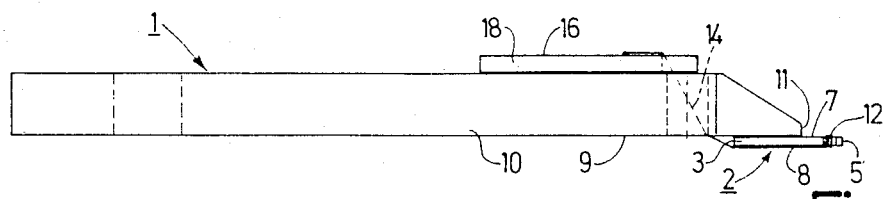
FIG. 2 is a side view of a conventional magnetic head unit having a magnetic head arranged on a carrier.
Figure 3:
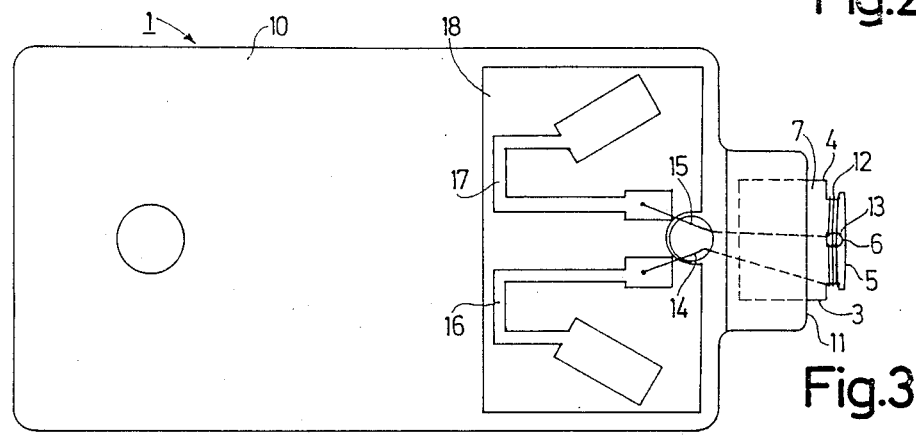
FIG. 3 shows the magnetic head unit according to FIG. 2 in a plan view.

FIGS. 2 and 3 show a conventional magnetic head unit 1 which is, suitable to be provided on a rotatable drum and for scanning a magnetic tape in obliquely extending tracks. The magnetic head 2 comprises two combined plate-shaped core limbs 3 and 4 of ferrite constituting on a narrow side a tape contact face 5 for a magnetic tape in which a gap 6 bounded by the two core limbs 3 and 4 terminates. Such a magnetic head has two side faces 7 and 8 extending transversely to the tape contact face 5 and to the gap 6. With one part of the side face 7 the magnetic head 2 is provided by means of, for example adhesion on a side face 9 of a carrier 10 so that its active part comprising the gap 6 projects from the free end 11 of the carrier 10. Contiguously to the area of the gap 6 the magnetic head is conventionally provided with a coil winding 12 which is passed through a coil window 13 provided in the two core limbs 3 and 4 and whose two ends 14 and 15 are connected to leads 16 and 17 formed as a printed circuit on a printed wiring board 18 which is arranged on the carrier 10.

If a magnetic tape is moved over the tape contact face 5 of the magnetic head 2 during operation of such a magnetic head unit, interference signals caused by mechanical vibrations of the magnetic head are known to be produced in the output signal of the magnetic head. In order to reduce such interference signals, a damping material may be provided on at least one side face of the magnetic head, which material then damps mechanical vibrations of the magnetic head.

It has been proved that the damping of such mechanical vibrations of the magnetic head 2 is particularly effective if a damping material having a relatively large density is used. To this end a synthetic resin filled with less than 30% by volume of filler is used as a damping material, in which the filler has a density of more than $10 \times 10^3$ kg/m$^3$ and in which the part by weight of the filler is at least 74% by weight, whilst the density of the damping material is larger than $4 \times 10^3$ kg/m$^3$. An example of a synthetic resin which may be used for this purpose is an epoxy resin such as is available from the firm of Ciba-Geigy under the commercial name "Araldit F" which has a density of approximately $1.2 \times 10^3$ kg/m$^3$. For the mixing ratios stated, densities of the damping material which are larger than $3.4 \times 10^3$ kg/m$^3$ can be achieved dependent on which filler having a density of more than $10 \times 10^3$ kg/m$^3$ is used such as, for example lead or tantalum. Practice has proved that a satisfactory suppression of the interference signals is achieved if the density of the damping material is more than $4 \times 10^3$ kg/m$^3$. The mixing ratios stated for the synthetic resin with the filler having a density of more than $10 \times 10^3$ kg/m$^3$ also result in the particles of the filler embedded in the synthetic resin having an adequate mutual freedom of movement so that they yield a satisfactory damping in co-operation with the synthetic resin.

Figure 1:
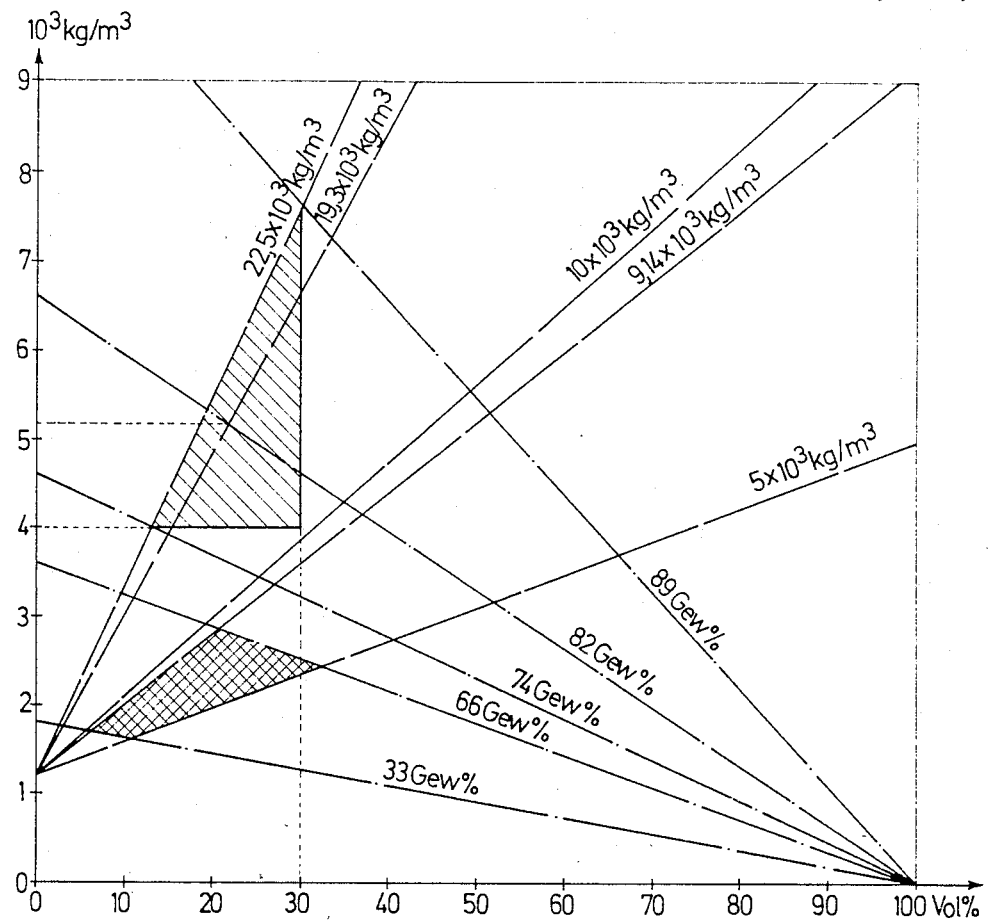
FIG. 1 shows a diagram illustrating the resultant relationships when using different mixing ratios and compositions of the damping material.

The diagram shown in FIG. 1 illustrates the relevant ratios. In this diagram the density of the damping material is plotted in $10^3$ kg/m$^3$ on the ordinate and the part by volume of the filler in the damping material is plotted in % by volume on the abscissa. The broken lines in the diagram correspond to a given density of the filler used, which density is indicated in $10^3$ kg/m$^3$ and the dot-and-dash lines correspond to a given part by weight of the filler in the damping compound in % by weight. The density of the filler is top-limited by the materials having a largest density of $22.5 \times 10^3$ kg/m$^3$ such as osmium or iridium. With the aforementioned mixing ratios a range of the selectable density of the damping material indicated by means of a simple cross-hatched area in the diagram is achieved.

It has been proved to be particularly advantageous if the damping material comprises tungsten as a filler which has a density of $19.3 \times 10^3$ kg/m$^3$ so that densities of up to $6.6 \times 10^3$ kg/m$^3$ for the damping material can be achieved under the previously mentioned conditions, as can also be derived from the diagram shown in FIG. 1. Apart from the large densities which can be achieved for the damping compound, such a damping material can be manufactured in a simple manner and at low cost. With regard to a particularly satisfactory damping it has been proved to be very advantageous if the part by weight of tungsten is chosen to be approximately 82% by weight, by which a density for the damping material of the order of $5.2 \times 10^3$ kg/m$^3$ is obtained. The particularly satisfactory damping effect is based on the fact that with such a density of the damping material a uniform distribution of the particles of the filler in the synthetic resin and a perfect cladding thereof by the synthetic resin can be achieved, whilst the separate particles still have an adequate mutual freedom of movement in order to yield the afore-mentioned very satisfactory damping in co-operation with the synthetic resin.

Figure 4:
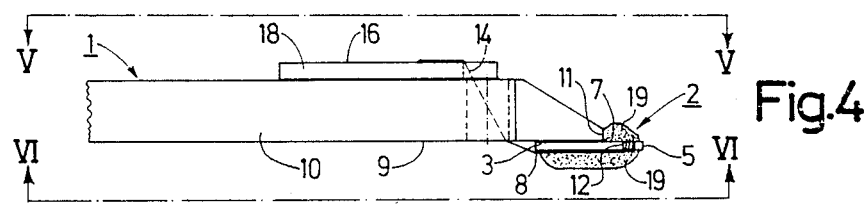
FIG. 4 shows a magnetic head unit in which damping material is provided on all the freely accessible surface portions of the two side faces of the magnetic head.
Figure 5:
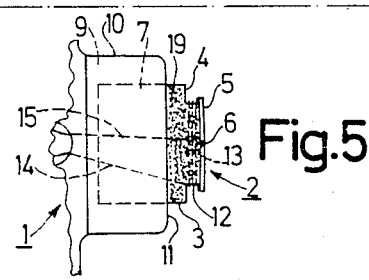
FIG. 5 is a plan view taken on the line V—V in FIG. 4.
Figure 6:
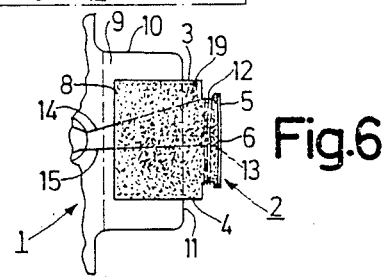
FIG. 6 is a bottom view taken on the line VI—VI in FIG. 4.

In the embodiment shown in FIGS. 4, 5 and 6 a damping material 19 as mentioned hereinbefore is provided on the freely accessible surface portions of the two side faces 7 and 8 of the magnetic head 2, with its side face 8 being completely freely accessible in this case. In the relevant embodiment these surface portions are completely coated with the damping material 19. It would of course alternatively be possible to provide damping material only in part on these surface portions or to provide the damping material on only one of the two side faces of the magnetic head. To this end the damping material 19 is provided in a fluid state on the relevant surface portions and is subsequently cured, or in other words baked, in accordance with the requirements imposed on the synthetic resin used. In this connection it has been proved to be essential that no or no excessive tensions in the ferrite of the core limbs 3 and 4 are produced during curing of the damping material. In fact such tensions affect the magnetical properties of the ferrite and hence the electrical signal properties of the overall magnetic head. In order to obviate such unwanted influences it has been proved to be essential that the modulus of elasticity of the damping material ranges between $10^7$ and $10^9$ Pa, whilst it has been found to be particularly advantageous if the modulus of elasticity is chosen to be of the order of $3 \times 10^8$ Pa. The choice of such a modulus of elasticity of the damping material is conventionally made by adding a softener to the synthetic resin. In this manner the electrical signal properties of the magnetic head are not influenced detrimentally, whilst a satisfactory damping of the mechanical vibrations of the magnetic head is achieved so that substantially no interference signals occur in the output signal of the magnetic head when a magnetic tape is moved over the tape contact face 5 of the magnetic head 2.

Figure 7:
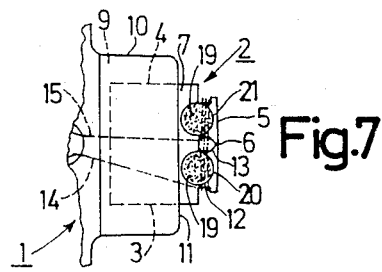
FIG. 7 is a plan view of a magnetic head unit in which damping material is only provided at locally bounded areas on the freely accessible surface portions of the two side faces of the magnetic head.
Figure 8:
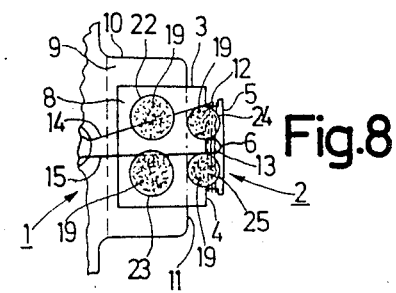
FIG. 8 is a bottom view of the magnetic head unit shown in FIG. 7.

To avoid tensions in the ferrite of the two core limbs 3 and 4 of the magnetic head 2, it has been found to be advantageous if the damping material 19 is provided only on locally bounded areas of the freely accessible surface portions of the side faces 7 and 8 of the magnetic head while leaving intermediate spaces between the areas, as is shown in the embodiment according to FIGS. 7 and 8. In the relevant embodiment damping material 19 is provided on two areas 20 and 21 of the freely accessible surface portion of the side face 7 and on four areas 22, 23, 24 and 25 of the complete freely accessible side face 8, whilst the other surface portions remain free from damping material. The number of areas on which damping material is provided and their location can of course be varied. In the relevant embodiment the bounding of the separate areas on which damping material is provided is circular, which is achieved if the damping material is provided drop-wise. It is, however, alternatively possible to provide the damping material in a strip-shaped pattern or in a different pattern.

It is to be noted that embodiments of the entire magnetic head unit different from those described are of course alternatively possible. For example, the carrier on which the magnetic head is provided may be a directly rotatable drum. The measures according to the invention can also be used for a magnetic head which itself is stationary or is moved radially with respect to a disc-shaped record carrier. As is evident the afore-mentioned embodiments may comprise a range of modifications without passing beyond the scope of the invention. In this connection it is also to be noted that the damping material can be provided on at least one of the two side faces of the magnetic head before the magnetic head is mounted on a carrier. Likewise the damping material can be provided on at least one of the two side faces of the magnetic head before its two core limbs are provided with a coil winding.

What is claimed is:

1. A magnetic head comprising two combined plate-shaped ferrite core limbs constituting on a side a tape contact face for a record carrier in which a gap bounded by the two core limbs terminates, a damping material being at least partly provided on at least one of the two side faces constituted by said two core limbs and extending transversely to the tape contact face, characterized in that the damping material is a synthetic resin filled with less than 30% by volume of filler, which filler has a density of more than $10 \times 10^3$ kg/m$^3$ and is at least 74% by weight of the damping material and in that the density of the damping material is larger than $4 \times 10^3$ kg/m$^3$ and its modulus of elasticity ranges between $10^7$ and $10^9$ Pa.

2. A magnetic head as in claim 1 wherein the damping material comprises tungsten as a filler.

3. A magnetic head as in claim 1 wherein the density of the damping material is chosen to be of the order of $5.2 \times 10^3$ kg/m.

4. A magnetic head as in claim 1 wherein the modulus of elasticity of the damping material is chosen to be of the order of $3 \times 10^8$ Pa.

5. A magnetic head as in claim 1 wherein the damping material is provided on only a selected portion of the side faces with other portions of the side faces being free from damping material.

* * * * *